Feb. 13, 1934.   J. KUCHAR   1,946,798
TRACK FOR TRACK LAYING WHEELS
Filed Nov. 16, 1931   6 Sheets-Sheet 1
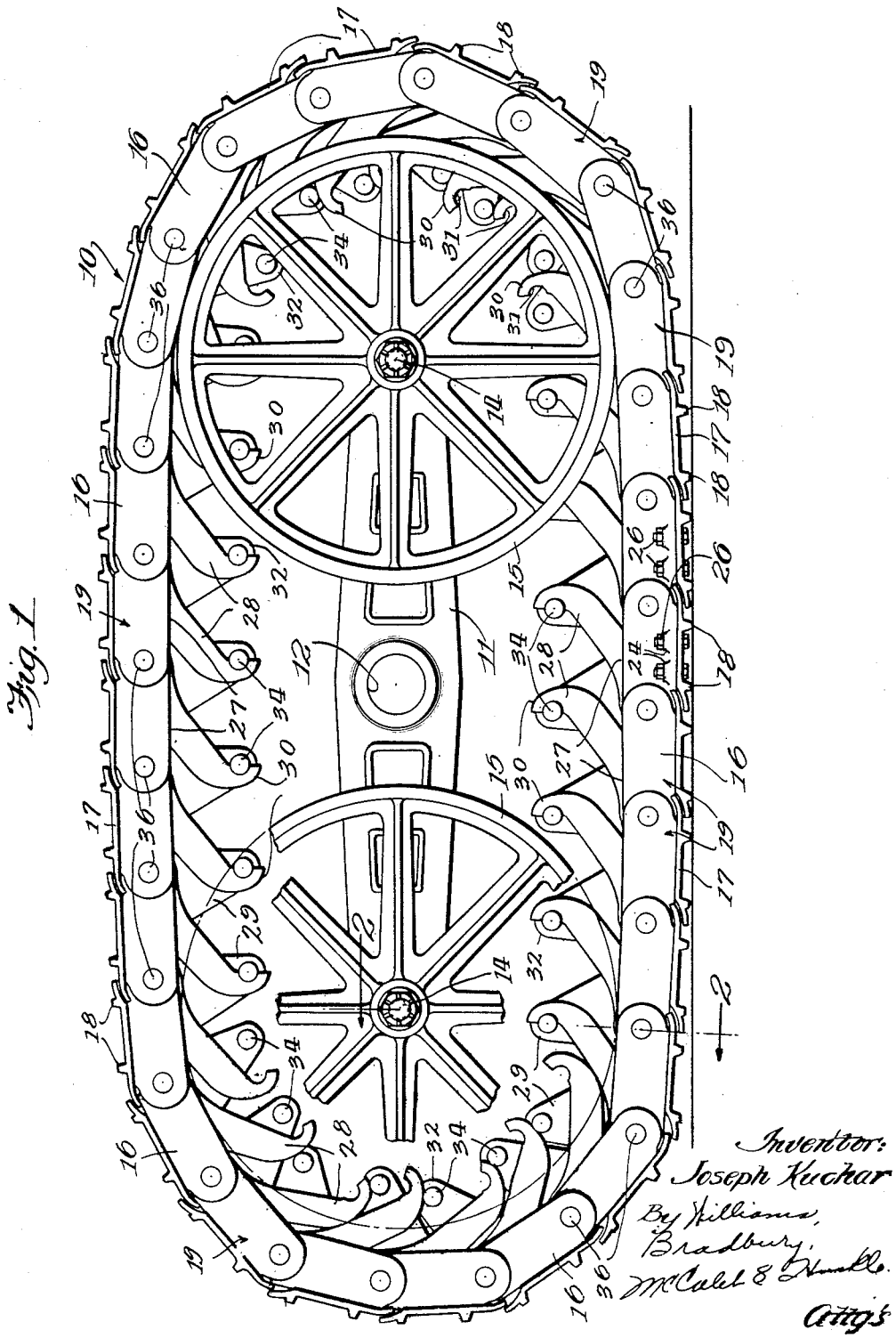

Feb. 13, 1934.  J. KUCHAR  1,946,798
TRACK FOR TRACK LAYING WHEELS
Filed Nov. 16, 1931  6 Sheets-Sheet 2
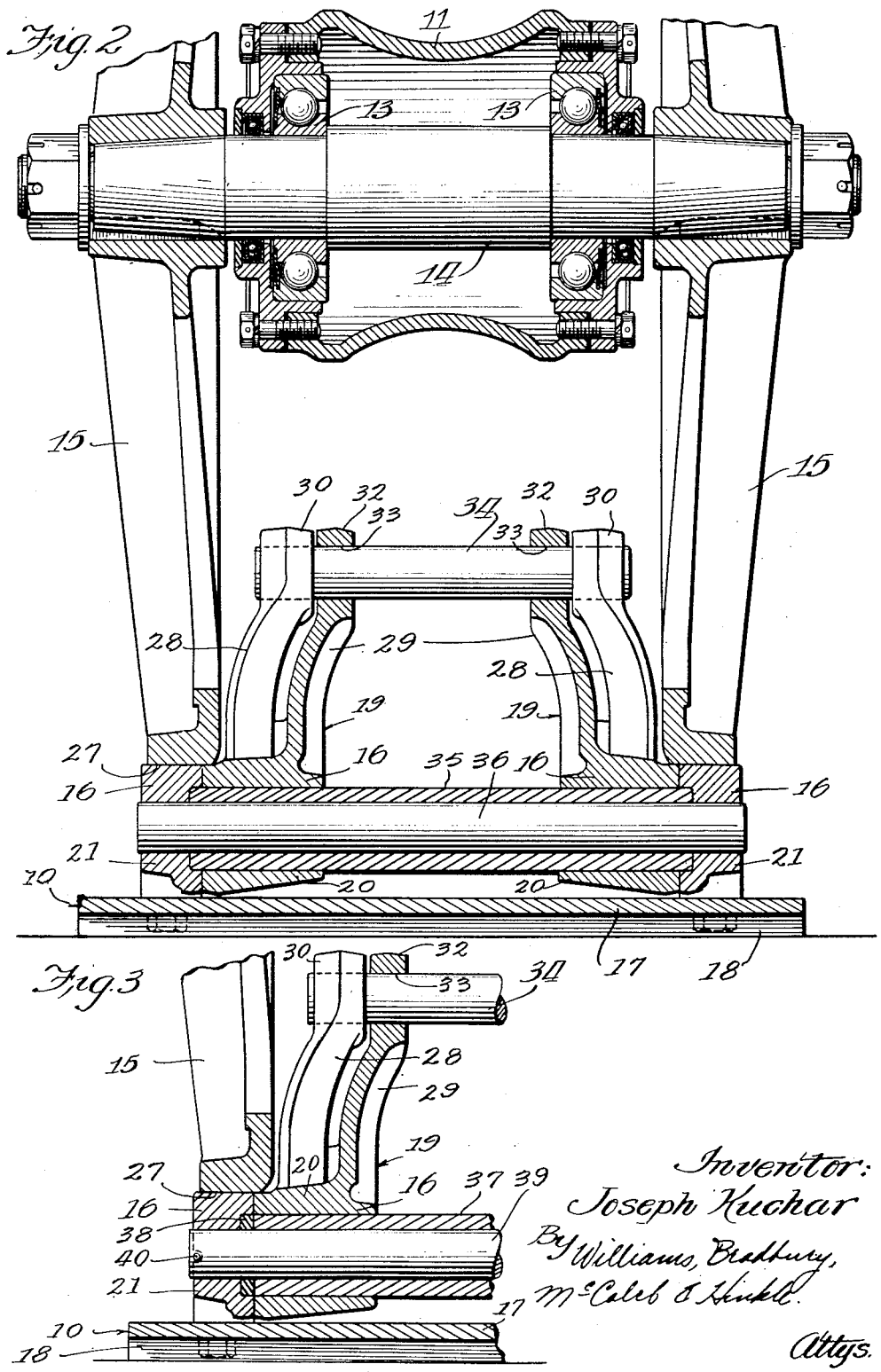

Feb. 13, 1934.　　　J. KUCHAR　　　1,946,798
TRACK FOR TRACK LAYING WHEELS
Filed Nov. 16, 1931　　6 Sheets-Sheet 3

Inventor:
Joseph Kuchar
By Williams,
Bradbury,
McCaleb &
Hinkle
Attys.

Feb. 13, 1934. J. KUCHAR 1,946,798
TRACK FOR TRACK LAYING WHEELS
Filed Nov. 16, 1931 6 Sheets-Sheet 4
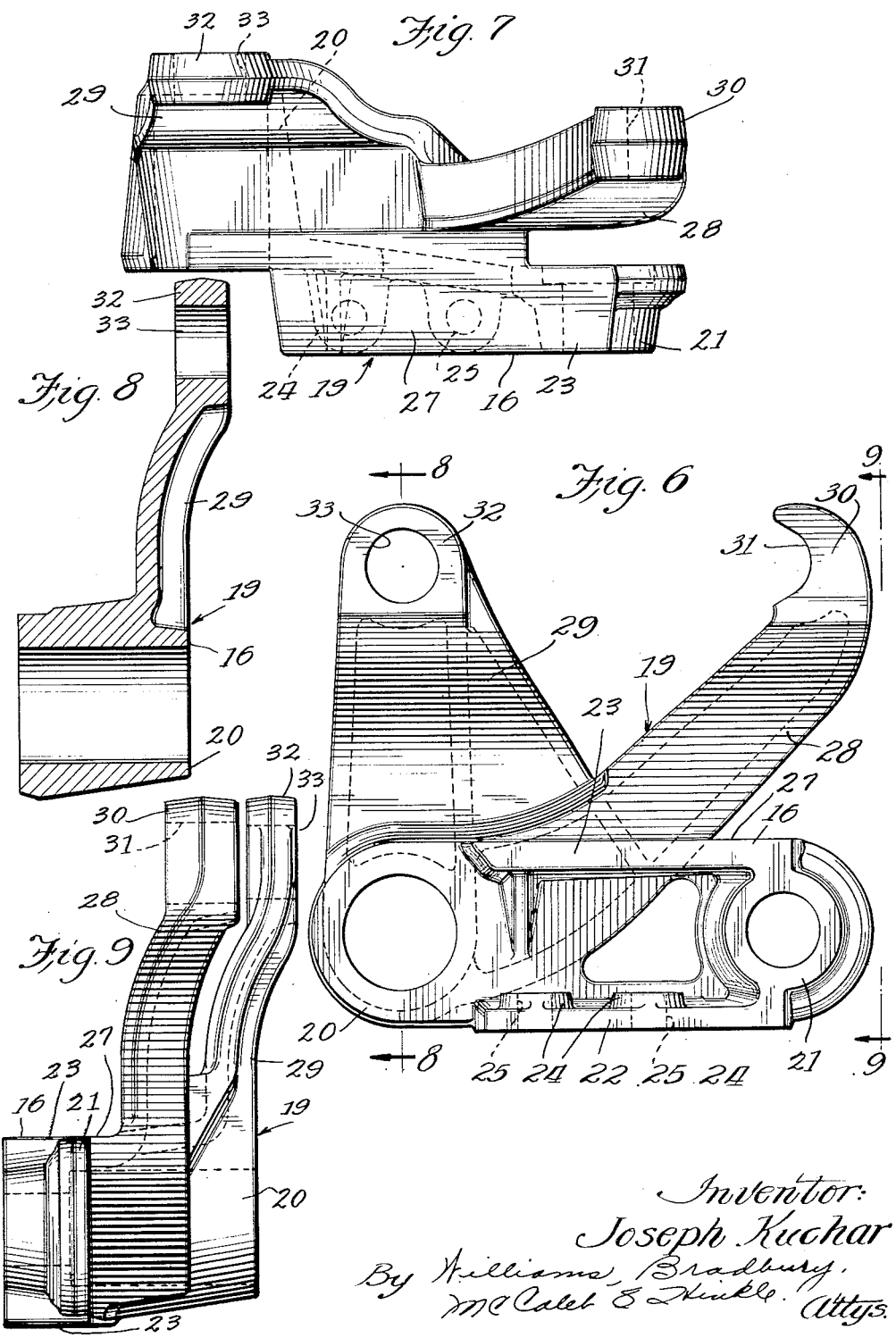

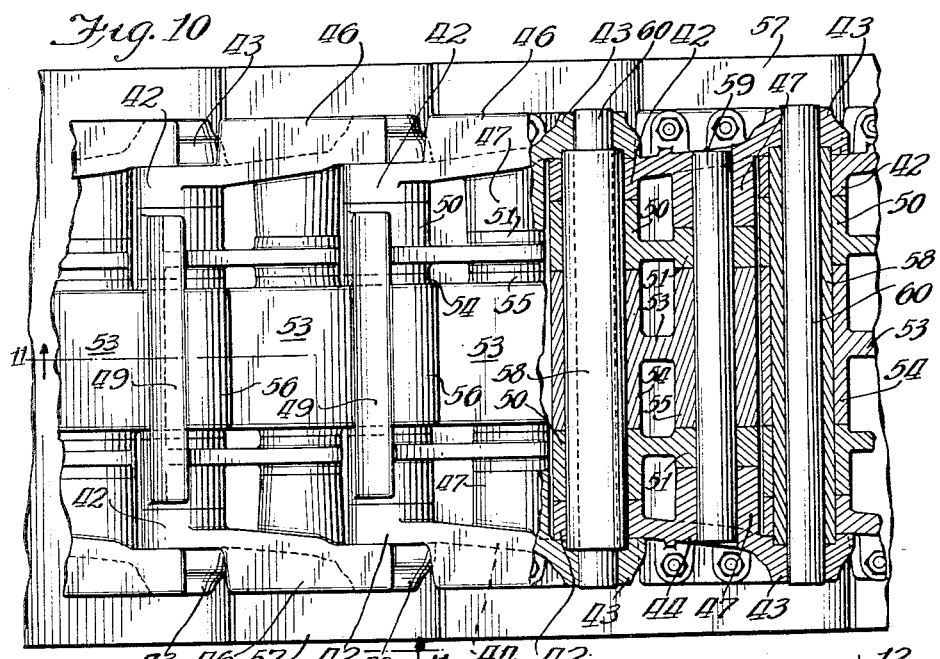
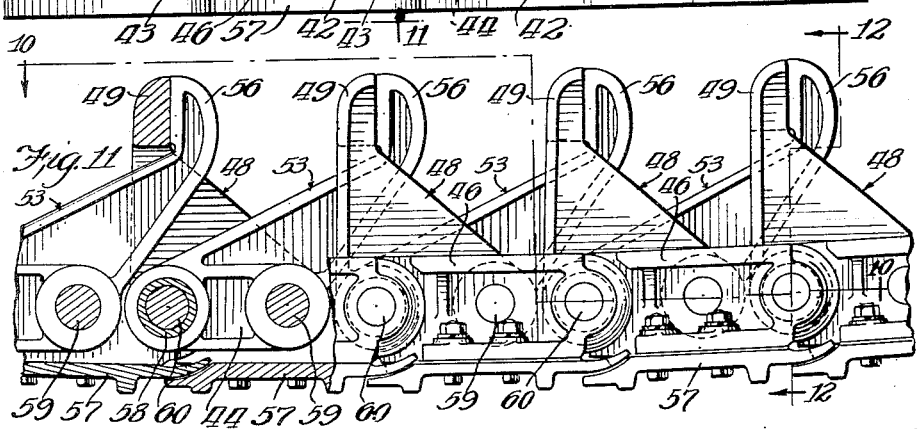
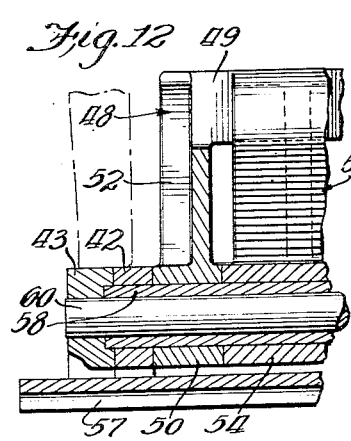
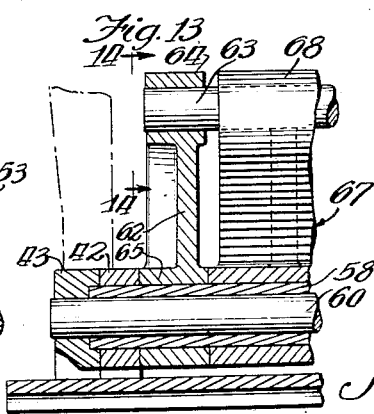
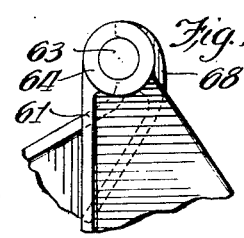

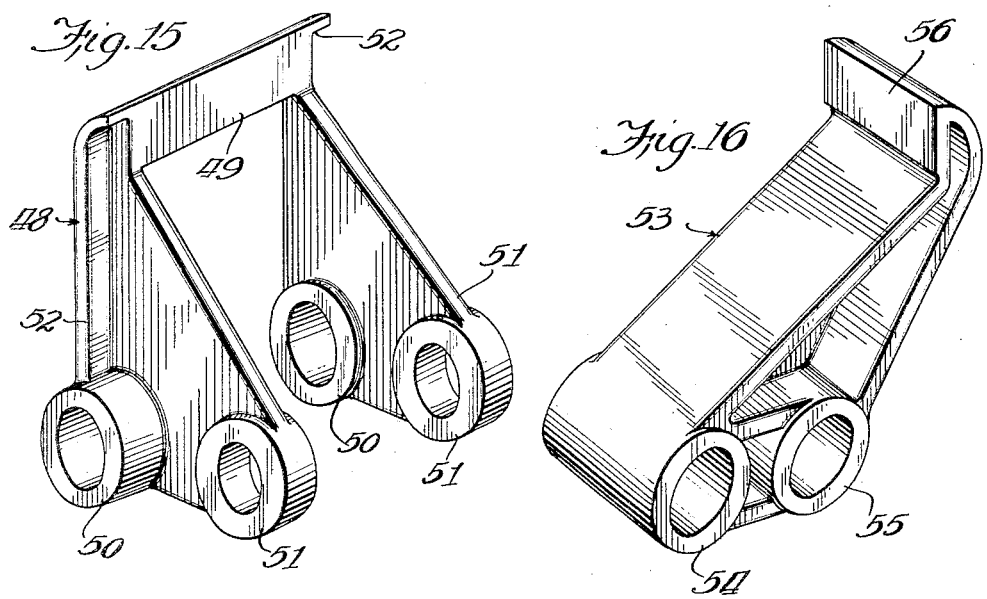
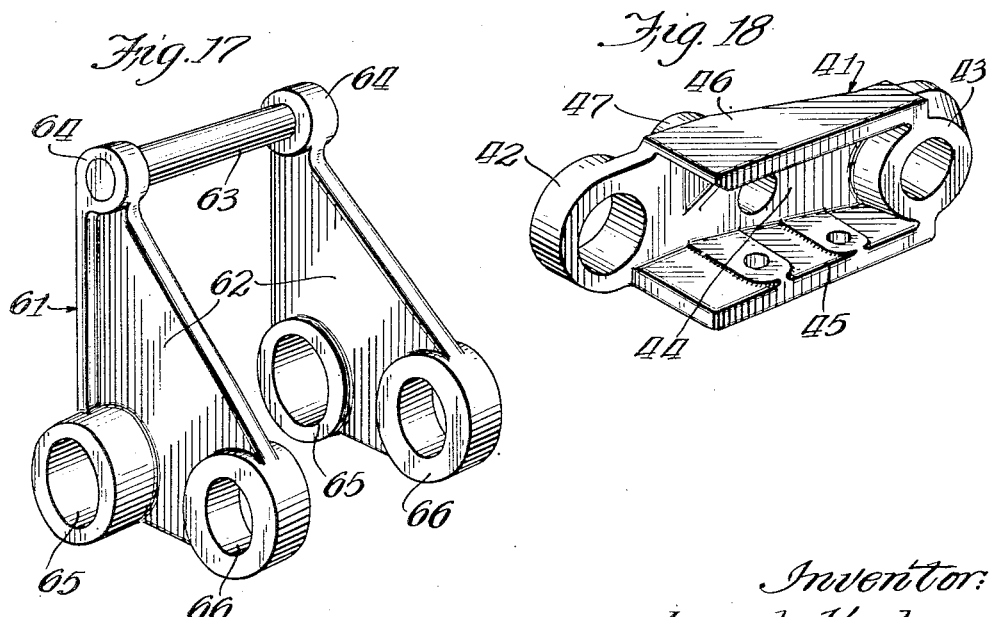

Patented Feb. 13, 1934

1,946,798

UNITED STATES PATENT OFFICE 1,946,798

TRACK FOR TRACK LAYING WHEELS

Joseph Kuchar, Chicago, Ill., assignor to Forged-Trak Co., Chicago, Ill., a corporation of Delaware Application November 16, 1931
Serial No. 575,177

14 Claims. (Cl. 305—10)

This invention relates to tracks for track laying wheels which are adapted to be laid on the ground to provide support for a vehicle, and to be raised continuously as the vehicle proceeds.

The invention particularly relates to tracks comprising a series of articulated track elements, adjacent elements being adapted to interengage so as to provide a beam or bridge which is rigid against displacement in one direction and which is flexible with respect to displacement in the opposite direction.

One of the objects of the invention is to provide an improved track.

A further object of the invention is to provide an improved track element.

A further object of the invention is to provide a track built of a plurality of materials so that each portion of the track element is of the material particularly adapted to its function.

Other objects, advantages and capabilities of the invention will hereinafter appear in the following description of a preferred embodiment thereof taken in conjunction with the accompanying drawings, in which:

Fig. 1 is a side view of a truss wheel embodying my invention;

Fig. 2 is a fragmentary sectional view on a larger scale taken on the line 2—2 of Fig. 1;

Fig. 3 is a sectional detail view showing the manner in which the ends of the track are united after the track has been applied to a wheel;

Fig. 6 is a side elevation of one of the link elements;

Fig. 7 is a plan view thereof;

Fig. 8 is a sectional view taken on the line 8—8 of Fig. 6;

Fig. 9 is an end view taken on the line 9—9 of Fig. 6;

Fig. 10 is a plan view partly in section of a modified form of track, the section being taken on the line 10—10 of Fig. 11.

Fig. 11 is an elevation partly in section, the section being taken on the line 11—11 of Fig. 10;

Fig. 12 is a sectional detail taken on the line 12—12 of Fig. 11;

Fig. 13 is a similar sectional detail showing a further modification of the invention;

Fig. 14 is an elevational detail on the line 14—14 of Fig. 13;

Fig. 15 is a perspective view of a member used in the assembled track shown in Figs. 10, 11 and 12;

Fig. 16 is a perspective view of a member cooperating therewith;

Fig. 17 is a perspective view of an assembled member used in the assembled track shown in Figs. 13 and 14; and Fig. 18 is a perspective view of a link element used in the assembled track shown in Figs. 10 to 14 inclusive.

Figure 5:
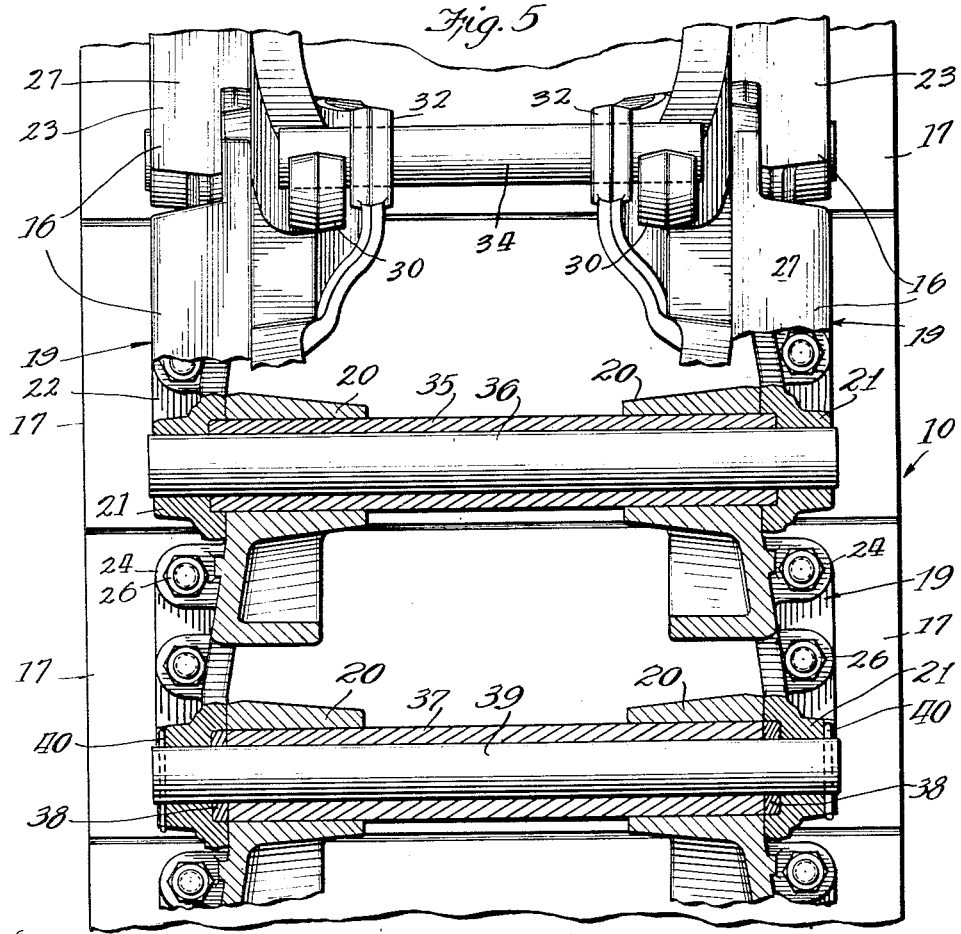
Fig. 5 is a plan view partly in section taken on the line 5—5 of Fig. 4.

Referring to the drawings, particularly Figs. 1 to 9 inclusive, the improved track 10 is shown as part of a truss wheel. This truss wheel comprises a beam 11 which is adapted to be mounted on an axle at the center 12. At either end the beam 11 carries bearings 13 for axles 14 which project outwardly from the beam 11 at either side. Wheels 15 are keyed to the axle 14 at each end. The peripheries of the wheels 15 are adapted to engage with portions of the track, which provide a rail or support for said wheels in the manner hereinafter more fully described.

The track 10 is constituted by a number of articulated elements 16 which are pivotally connected in series so that the same may accommodate themselves around the wheels 15 in the manner shown in Fig. 1. Means are provided upon each track element so that they interlock in such a manner that the track is rigid when subjected to load in one direction and is flexible and readily bent in the other direction. The rigidity referred to is important in the portion of the track located below and between the two wheels 15, this portion acting as an inverted bridge and distributing over a large area the load applied by the axle to the beam 11.

Each track element comprises a shoe plate 17 which may be formed of forged steel or other suitable material. Each plate 17 may be provided with transverse grousers or ribs 18. At its forward and rearward edges the plate 17 is provided with complementary curved portions which cooperate with complementary elements upon the adjacent shoe plate, in the manner shown in Figs. 1 and 4. On each side each shoe plate 17 has secured thereto a link element 19 which will now be described.

The link element 19 preferably is a forging of the structure and configuration shown in Figs. 6 to 9 inclusive. The link element 19 is provided with hubs 20 and 21 which are staggered transversely in the longitudinal direction so that the outer face of the hub 20 is in substantial longitudinal alignment with the inner face of the hub 21, as will be more readily understood with reference to Fig. 5. The hubs 20 and 21 are connected by a lower web or base 22 and an upper web 23. The base 22 is provided on its upper side with bosses 24 which are provided with openings 25 whereby the element may be secured to the shoe plate 17 by means of bolts 26. The upper surface of the web 23 is machined to provide a flat face 27. As will hereinafter appear, the flat faces 27 of the aligned links provide a track or rail for the wheels 15, which track or rail is laid down in front of the wheels and is taken up after the last wheels have passed over it.

On the inner side of the surface 27 the link element is provided with a pair of upwardly extending arms 28 and 29. The arm 28 extends obliquely from the intermediate portion of the link and terminates directly above the hub 21 and somewhat inwardly with respect thereto, owing to the inwardly curved configuration of the arm 28, as shown more clearly in Fig. 9. The arm 28 may be in the form of a web reinforced by ribs in the manner shown in Fig. 6. The end 30 of the arm 28 is provided on its inner side with a recess 31, the axis of which is in the vertical plane passing through the axis of the hub 21.

The arm 29 is in the form of a web which arises from the link along its inner side. This web is reinforced by suitable ribs and terminates at its upper end in a boss 32 which is provided with a bore 33. This bore 33 is located at the same height as the recess 31 of the arm 28. The arm 29 is curved inwardly as shown in Fig. 9 so that the boss 32 is located inwardly with respect to the end 30, sufficient transverse clearance being provided to permit the operation of the track in the manner which will hereinafter appear.

It will be understood that the link element 19 which is secured to the other side of the shoe plate 17 is exactly similar to that described, but is a mirror image thereof, so that the arms 28 are transversely opposite each other and the arms 29 are transversely opposite, both pairs of arms 28 and 29 being located inside the wheels 15, as will be seen in Fig. 2. Each pair of arms 29 is connected by pins 34 which have a drive fit in the openings 33. The ends of the pins 34 extend beyond the bosses 32 of the arms 29 so as to engage the ends 30 of the arms 28 of the adjacent track element in the manner hereinafter described.

The bosses 20 of each opposite pair of link elements 19 are connected by sleeves 35 which have a drive fit therein, and extend slightly therebeyond on either side so that in assembled condition said ends project into the bosses 21, which are counterbored to receive them. Pins 36 have a drive fit in the bosses 21 and extend through the sleeves 35 in which they have a working fit.

In assembling the track two opposite link elements 19 are placed on either side of a sleeve or bushing 35 and the pin 34. The link elements are pushed inwardly so as to enter the bushing 35 in the hubs 20 so as to project therebeyond to the desired extent, and to push the ends of the pin 34 through the openings 33 so as to project on either side to the desired extent.

A further pair of opposite links 19 are then applied to the assembly with the hubs 21 in alignment with the hubs 20 of the assembly. The hub 21 is provided with a counterbore or recess adjacent its inner face, which is adapted to receive the projecting end of the sleeve 35. In applying the last said link members 19 a pin 36 is first passed into the sleeve 35 of the assembly and the last said links 19 are forced inwardly so that a pin 34 is projected through the openings 33 and a sleeve 35 is projected into the bosses 20 in the same manner as in the assembly of the first two links 19. This assembling operation is continued until a track of the desired length is built up.

The link elements 19 may be bolted to the shoe plates 17 at any time after these links are assembled with respect to the sleeve or bushing 35. While it has been indicated that it is preferred to press opposite links 19 upon the pins 34 and 36 simultaneously with the pressing of the links upon the sleeve 35, it will be understood that this manner of assembly may be modified. For example, the pins 34 and 36 may be pushed from one side of the links 19 after they have been assembled upon the bushing 35, or one of these pins may be assembled simultaneously with the assembly of the links on the sleeve or bushing 35, the other pin being pushed from one side of the opposed links in a subsequent operation.

It will be noted that the sleeve 35 having a press fit in the bosses 20, secures the opposite links 19 in rigid assembly. The pin 36 having a press fit in the bosses 21, is rigid with respect thereto. Between the sleeves 35 and pins 36 there is a working clearance. Consequently the only surfaces subjected to wear owing to the relative movement between adjacent links are the inner surfaces of the sleeves 35 and the outer surfaces of the pins 36 in contact therewith. Owing to the construction described, these surfaces are enclosed with respect to sand and dirt and are adapted to retain lubricant supplied thereto in any desired manner, for a considerable time.

Figure 4:
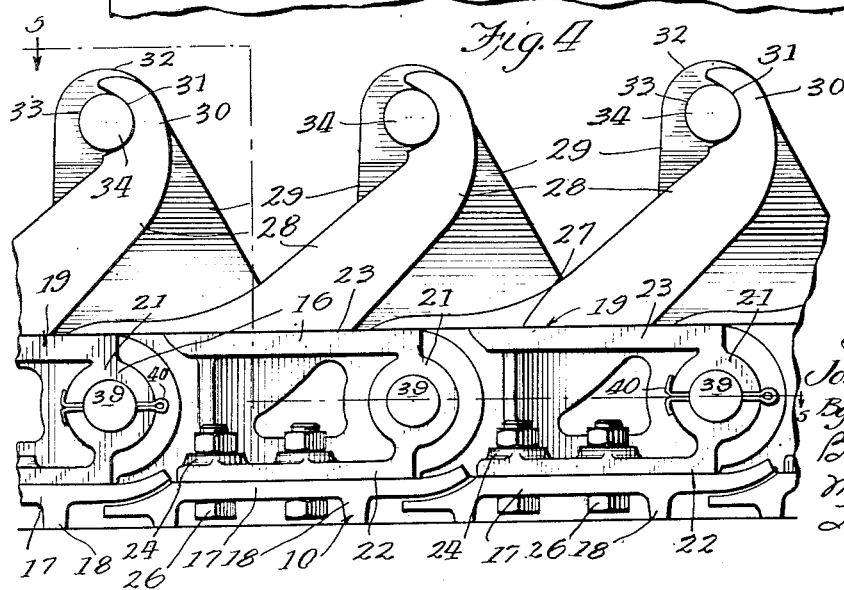
Fig. 4 is a side view of a portion of the track showing the construction thereof in greater detail than is shown in Fig. 1, and on a larger scale.

It will be seen from Fig. 4 that the arms 28 project longitudinally of the track into the inner side of the pin 34 of one of the adjacent track elements, and are adapted to engage the projecting ends of the pin 34 of said adjacent track element, so that any tendency for the track to be moved upwards, as viewed in Fig. 4, will be opposed and prevented by the engagement of the arms 28 and the pins 34. It will readily be seen from Fig. 1 that the portion of the track below and between the wheels 15 is subjected to an upward force which is the reaction of the load applied upon the ground. This beam rigidity of that portion of the track causes the load to be distributed over the area of the track in contact with the ground, so that ground support can be obtained from soft ground. The track is flexible in the opposite direction, since the end 30 can simply move away from the pin 33 with which it is in contact so as to permit the track to fold up when passing around the wheels 15, as will readily be understood from Fig. 1.

In order that the ends of the track may be readily united together and disconnected, for example, when applying the track to the wheels 15 or removing it therefrom, I make the sleeve 37 at one extremity of the track shorter than the sleeves 35, so that its ends lie flush with the hubs 20 in which it is pressed. The hubs 21 at the other end of the track are provided with recesses on their inner side which receive rings 38, which occupy the position of the projecting ends of the sleeves 35 in the other pivots of the track. A pin 39 has a free sliding fit through the sleeve 37, the rings 38 and the bosses 21 associated therewith. These bosses 21 are provided on their outer faces with slots, so that cotter pins 40 may be passed through openings at the extremities of the pin 39 so as to hold said pin in position.

It will readily be understood that the track is assembled by applying the same around the wheels 15. The rings 38 are inserted in the recesses on the inner side of the hubs 21. The hubs 20 are then slipped in between the hubs 21 and the pin 39 is slipped into position. The cotter pins 40 are then inserted and the installation is complete.

In the embodiment of the invention illustrated in Figs. 10, 11, 12, 15, 16 and 18, the arms of the link element which interengage with arms carried by adjacent link elements are not integral with the link elements. The form of this link element 41 will readily be understood from Fig. 18, from which it will be seen that it comprises hubs 42, 43 connected by an inclined vertical web 44. The web 44 carries the base 45 and also the upper web 46, which serves as a rail or track for the wheels 15 in the manner described in connection with the previous embodiment. The base 45 is provided with bolt holes whereby the link element 41 may be rigidly secured to the shoe plate 57.

Intermediate the bosses 42 and 43 the web 44 is provided with a boss 47, which is used in securing the interlocking arms to the link elements, as will hereinafter appear.

The interlocking elements are shown in Figs. 15 and 16. The element 48, shown in Fig. 15, comprises two parallel webs which may be of substantially triangular form. At their upper ends they are connected by a bar 49 and at their lower ends they carry bosses 50 and 51, the former and latter being in transverse alignment. The element may be reinforced by ribs 52.

The interlocking element 53 shown in Fig. 16 comprises a pair of hubs 54 and 55, which are adapted to be inserted between the webs of the interlocking element 48 so as to bring them into alignment with the hubs 50 and 51, respectively. The element 53 is substantially in the shape of an obtuse angle triangle, the hubs 54 and 55 being located at the base, so that the upper end of the element extends away from the associated element 48 so as to enable it to engage the bar 49 of the adjacent track element in the manner shown in Fig. 11. At its upper end the element 53 is provided with a flat face 56 which is adapted to engage the flat face of the bar 49 with the element 48.

In the assembled track an interlocking element 48, an interlocking element 53 and two link elements 41 are secured together in rigid relationship, for example by means of a sleeve 58 and pin 59. The sleeve 58 extends through the hub 54 of the element 53 and each end of the sleeve 58 projects through one of the hubs 50 and one of the hubs 42 of the interlocking element 48 and link element 41, respectively. As will readily be seen from Fig. 10, the extremities of the sleeve 58 project beyond the outer faces of the hubs 42 and are received within counterbores on the inner face of the hubs 43. Since there is no relative movement between the elements 48, 53 and 41, the sleeve 58 may have a drive fit in the hubs 54, 50 and 42. The pin 59 passes through the hub 55 of the interlocking element 53 and each end of the pin 59 projects beyond the hub 55 into a hub 51 and a hub 47 of the interlocking element 48 and a link element 41, respectively. Since there is no relative movement between the pin 59 and the hubs through which it passes, this pin may have a drive fit therein.

As shown in Fig. 10, each track element is connected to the adjacent track element by means of a pin 60 which extends through the sleeve 58 of one track element and has its ends extending into the hubs 43 of the adjacent track element. The pin 60 has a drive fit in the hubs 43 and has a working fit in the sleeve 58.

In assembling this track the interlocking elements 48 and 53 may first be assembled together by means of the sleeve 58 and pin 59. Thereafter the link elements 41 may be forced from either side on to the sleeve 58 and pin 59 and at the same time the hubs 43 of the link elements 41 may be forced on to the projecting ends of the pin 60 of an adjacent assembled link. The link elements 41 are subsequently bolted to the shoe plates 57, either during the assembly of the link elements 41 into a chain of the desired length, or after such a chain has been produced. To secure the ends of the track together in applying same to the wheels 15, the same structure may be employed as described in connection with the previously described modification.

In the further modification shown in Figs. 13, 14 and 17, the structure and assembly is substantially similar to that shown in Figs. 10, 11, 12, 15, 16 and 18. In this modification, however, the interlocking element 61, which corresponds to the element 48, comprises two side members 62 which are connected together by a pin 63, which has a drive fit in hubs 64 at the upper ends of the side members 62. The side members 62 carry at their lower ends bosses 65 and 66 which correspond to the bosses 50 and 51, respectively.

The interlocking member 67, which engages the interlocking member 61, is closely similar to the interlocking member 53 of the last described embodiment of the invention. It differs therefrom in that its upper end is provided with a hook-like formation 68 which is adapted to engage the pin 63. It will be obvious that the manner of assembly may be substantially identical with that of the last described embodiment.

Although the invention has been described in connection with the specific details of preferred embodiments thereof, it must be understood that such details are not intended to be limitative of the invention except insofar as set forth in the accompanying claims.

Having thus described my invention, what I claim as new and desire to secure by Letters Patent is:

1. A track comprising a series of link elements pivotally secured together, a similar series of link elements located opposite thereto, a series of shoe plates to each of which an opposed pair of link elements is secured, a pair of arms mounted on each of said link elements, a bridging means connecting the upper ends of one pair of opposed arms on each opposed pair of link elements, the other pair of opposed arms being adapted to engage the bridging means of the adjacent track element.

2. A track comprising a series of link elements pivotally secured together, a similar series of link elements located opposite thereto, a series of shoe plates to each of which an opposed pair of link elements is secured, a pair of arms integral with each link element, a bridging means connecting the upper ends of one pair of opposed arms on each opposed pair of link elements, the other pair of opposed arms being adapted to engage the bridging means of the adjacent track element.

3. A track element comprising a pair of links, a shoe plate on which said links are mounted, an interlocking element of substantially inverted U- shape, each leg of which is located adjacent one of the link elements, an interlocking element adapted to be located within said legs, and means for securing said interlocking elements to said link elements.

4. A track element comprising a pair of link elements provided with hubs at each end, a shoe plate to which said link elements are bolted, transverse means having a drive fit in opposed hubs, arms projecting upwardly from said link elements and integral therewith, and a removable pin securing the upper ends of an opposed pair of arms together, the upper ends of the arms being located vertically above the hubs of the link elements.

5. A track element comprising a shoe plate, a pair of link elements bolted thereto, said link elements being provided with three hubs in transverse alignment, transverse means having a drive fit in said aligned hubs, an interlocking element of substantially inverted U-shape, and an interlocking element located between the sides of the first said interlocking element, said interlocking elements being secured to the link elements by a plurality of the transverse means.

6. A track element comprising a shoe plate, a pair of link elements bolted thereto, said link elements being provided with three hubs in transverse alignment, transverse means having a drive fit in said aligned hubs, an interlocking element of substantially inverted U-shape, and interlocking element located between the sides of the first said interlocking element, and said interlocking elements being secured to the link elements by a plurality of the transverse means.

7. A track element comprising a shoe plate, a pair of link elements bolted thereto, said link elements being provided with three hubs in transverse alignment, transverse means having a drive fit in said aligned hubs, an interlocking element comprising side members and a pin securing them together at their upper ends, and interlocking element located between said side members, said side members and last said interlocking element being secured together by a plurality of said transverse means.

8. A track comprising two series of link elements, means pivotally connecting the elements of each series together and rigidly connecting the elements of both series in pairs, arms mounted on said elements adapted to interengage to render the track rigid in one direction and permit bending in the opposite direction, and a shoe plate removably secured to each of said pairs of link elements and adapted to be removed therefrom without disturbing the assembly of the remaining elements constituting the track.

9. A track comprising two series of link elements, means pivotally connecting the elements of each series and rigidly connecting the elements of both series in pairs, arms removably mounted on said elements adapted to interengage to render the track rigid in one direction and permit bending in the opposite direction, and a shoe plate removably secured to each of said pairs of link elements.

10. A track comprising a series of link elements pivotally secured together, a similar series of link elements located opposite thereto, means pivotally connecting the elements of each series together and rigidly connecting the elements of both series in pairs, a series of shoe plates to each of which an opposed pair of link members is removably secured, said shoe plates being removable from said link elements without disturbing the assembly of the remaining elements constituting the track, arms mounted on said link elements, the arms on adjacent links being adapted to interengage to render the track grid in one direction and permit bending in the opposite direction.

11. A track element comprising a pair of link elements having offset hubs at each end, a shoe plate to which the link elements are removably secured, arms carried by said link elements adapted to interlock with the arms of adjacent track elements, a pivoting member rigidly connecting said link elements together, and bridging means connecting a pair of opposite arms together.

12. A track element comprising a pair of link elements, a shoe plate to which the link elements are removably secured, arms carried by said link elements and integral therewith, and removable bridging means rigidly mounted on the upper ends of an opposed pair of said arms, said bridging means adapted to be operatively engaged by the other arms of an adjacent track element.

13. A track element comprising a pair of link elements, a shoe plate to which said link elements are removably secured, arms carried by said link elements, and removable bridging means rigidly mounted on the upper ends of an opposed pair of said arms, said bridging means being adapted to be operatively engaged by the other arms of an adjacent track element.

14. A track comprising two parallel series of link elements, means pivotally connecting the elements of each series together and rigidly connecting the elements of both series in pairs, arms carried by said link elements adapted to interengage, and a series of shoe plates to which opposed pairs of said link elements are removably secured, said shoe plates being thereby removably secured to the track and adapted to be removed therefrom without disturbing the assembly of the remaining elements constituting the track.

JOSEPH KUCHAR.